Oct. 17, 1939.   A. L. FREEDLANDER   2,176,734
CONNECTOR FOR BELTS
Original Filed Jan. 14, 1937   2 Sheets-Sheet 1
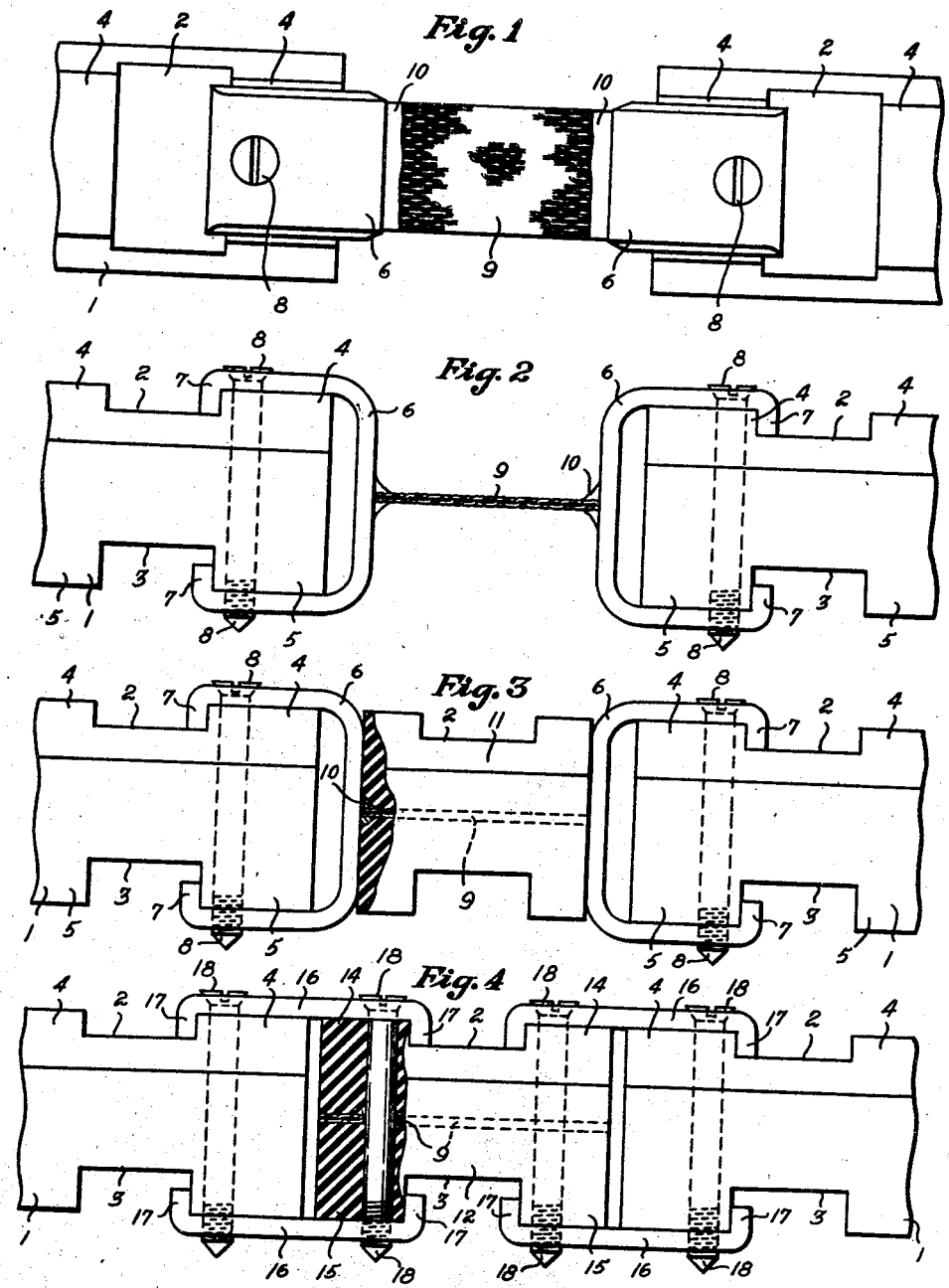
INVENTOR.
ABRAHAM L. FREEDLANDER
BY
ATTORNEYS.

Oct. 17, 1939. A. L. FREEDLANDER 2,176,734
CONNECTOR FOR BELTS
Original Filed Jan. 14, 1937  2 Sheets-Sheet 2
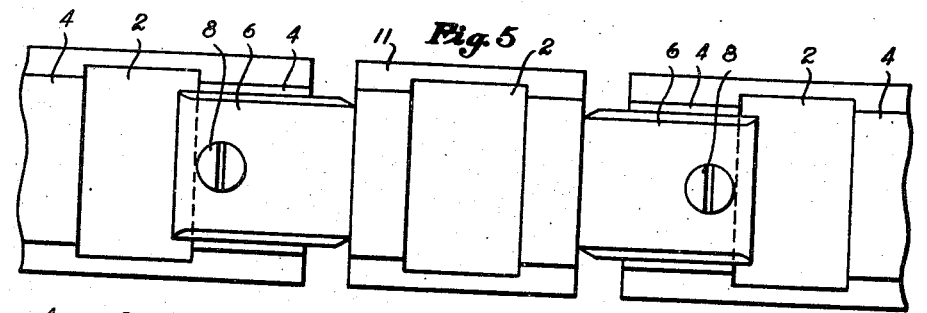
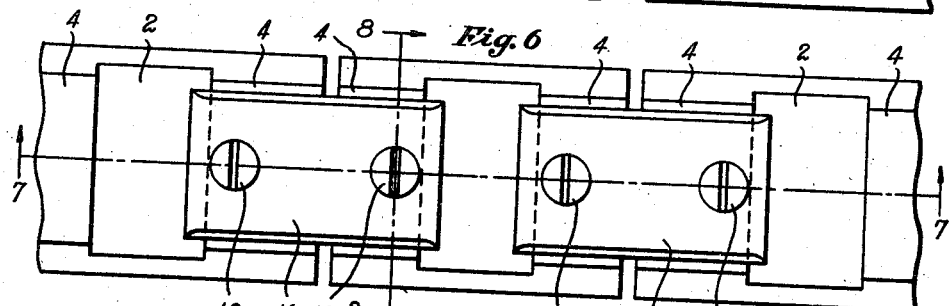
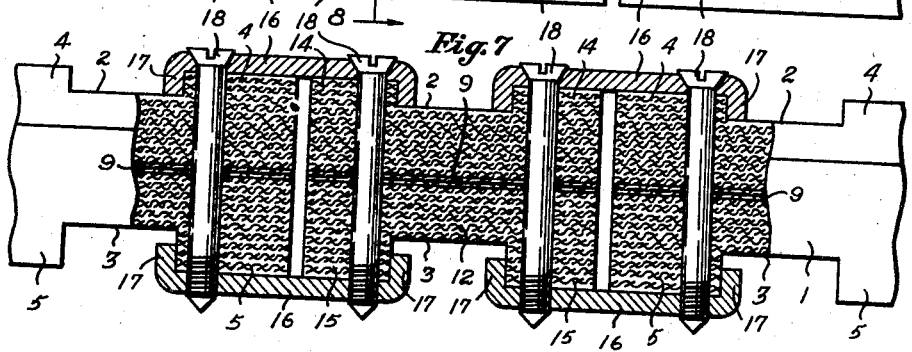
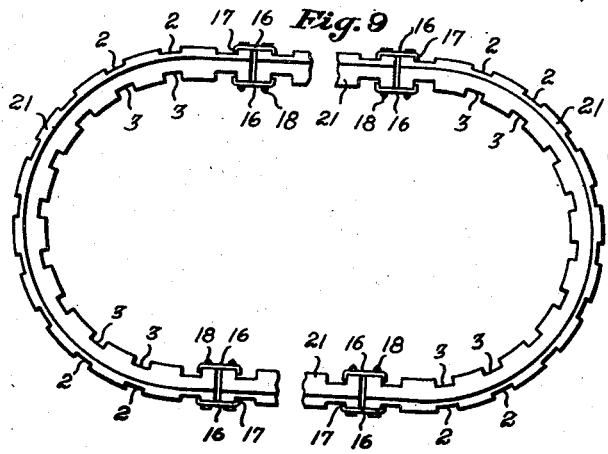
INVENTOR.
ABRAHAM L. FREEDLANDER
BY 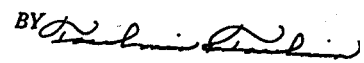
ATTORNEYS.

Patented Oct. 17, 1939

2,176,734

UNITED STATES PATENT OFFICE 2,176,734

CONNECTOR FOR BELTS

Abraham L. Freedlander, Dayton, Ohio, assignor to The Dayton Rubber Manufacturing Company, Dayton, Ohio, a corporation of Ohio Original application January 14, 1937, Serial No. 120,555, now Patent No. 2,121,125, dated June 6, 1938. Divided and this application February 9, 1938, Serial No. 189,624

1 Claim. (Cl. 24—37)

This invention relates to belts.

It is an object of this invention of provide a belt comprising a plurality of lengths of belt material provided with longitudinally inextensible reinforcement, which lengths are detachably connected to form an endless belt construction.

It is a further object of this invention to provide, in such a construction, means cooperating with a longitudinally inextensible reinforcement of the belt material to connect adjacent ends of the lengths or sections of the belt.

It is a further object of this invention to provide belt connecting means for detachably connecting the ends of a length of belt material to form an endless belt.

It is a further object of this invention to provide such a belt connector which is formed entirely of metal.

It is a further object of this invention to provide such a belt connector which comprises a pair of clamping members adapted to be secured by screws to the ends of the belt and which clamping members are connected by a length of flexible though longitudinally inextensible articulated metal mesh having its opposite ends each integrally secured to one of the clamping members.

It is a further object of this invention to provide such a belt connector construction, in which a cover in the form of a block of resilient material such as rubber or rubber impregnated fabric or the like is provided as a covering for the metal mesh.

It is a further object of this invention to provide, in such a belt connector, a block of resilient material such as rubber or the like which is formed in the shape of an analogous length of the belt body whereby to provide for substantial uniformity or operation of the belt having the connector secured therein.

It is a further object of this invention to provide means for connecting the adjacent ends of a belt, which means comprises a block of rubber or the like having incorporated therein a longitudinally inextensible flexible reinforcing member and means for detachably securing each of the opposite ends of the block to adjacent ends of a belt.

It is a further object of this invention to provide such a belt connector in which the block member is formed in the same shape and of the same materials as the belt.

It is a further object of this invention to provide such a connector block which is adapted to be detachably clamped at each end to an end of a belt by means of screws passing through the block and through the reinforcing means therein.

These and other objects and advantages will appear from the following description taken in connection with the drawings.

This application is a division of my copending application, Ser. No. 120,555, filed January 14, 1937, which matured into United States Patent No. 2,121,125, issued June 21, 1938, and containing the generic claims as well as specific claims to another species of the invention than the species claimed in the present divisional application.

In the drawings:

Figure 1 is a plan view of a belt connector constructed according to the principles of this invention as applied to a cog belt;

Figure 2 is an elevational view of the structure shown in Figure 1;

Figure 3 is a side elevational view, partly in section, of a modified form of belt connector;

Figure 4 is a side elevational view, partly in section, of a second modified form of belt connector as applied to a cog belt;

Figure 5 is a plan view of the structure shown in Figure 3;

Figure 6 is a plan view of the construction shown in Figure 4, but in which the connector block of the belt connector is formed of belt material;

Figure 7 is a cross sectional view, in elevation, taken on the line 7—7 of Figure 6;

Figure 8 is an elevational view, in section, taken on the line 8—8 of Figure 6; and Figure 9 is a diagrammatic view of an endless belt construction comprising a plurality of lengths or sections reinforced according to the principles of this invention and connected by clamping means and screws, as illustrated in Figures 4, 6 and 7.

Referring to the drawings in detail, and particularly Figure 1, the belt 1 is of hexagonal section (Figure 8) and is provided with outer transverse slotted portions 2 and inner transverse slotted portions 3 forming spaced outer teeth 4 and spaced inner teeth 5. In order to connect the end portions of the belt 1, a pair of substantially U-shaped clamping members 6 are disposed over the extreme end portions of the belt 1, which end portions include an outer tooth 4 and an inner tooth 5. The clamping members 6 are provided at each end with inturned flanges 7, one of which is adapted to be disposed in the slotted portion 2 adjacent the end tooth 4, while the other flange 7 is adapted to be disposed within the inner slotted portion 3 adjacent the end tooth 5. A screw 8 extends through an aperture in the outer leg of each clamping member 6, extends through the body of the belt 1 and is screw-threaded in the inner or opposite side of each clamping member 6 in order to secure the clamping members 6 to the ends of the belt 1. The respective clamping members 6 of the belt connector are necessarily oppositely disposed and are provided with a connection comprising an appropriate length of articulated metal mesh 9 having its ends secured by means of welding 10 to the clamping members 6. The mesh 9 is disposed substantially at the neutral axis of the belt 1. Other securing means may, if desired, be used to connect the ends of the mesh 9 to the respective clamping members 6.

The belt 1 may be formed of any suitable resilient material such as rubber or the like or of rubber impregnated fabric which may be reinforced, if desired, by the incorporation therein of a layer of metal mesh disposed substantially at the neutral axis thereof, as illustrated in Figure 7. The metal mesh 9 is freely flexible about transverse axes, but is substantially inextensible and it is preferred, in forming the belt connector illustrated in Figures 1 and 2, that the length of the mesh 9 be so chosen that the end teeth 4 and the end teeth 5 be separated at such distance as are teeth 4 and 5 separated in the body of the belt.

The construction of the belt connector illustrated in Figures 3 and 5 is the same as that illustrated in Figures 1 and 2, save that the mesh 9, which is preferably welded at its ends to the clamping members 6, is provided with a covering comprising a block 11 of rubber or the like of substantially the same shape as a corresponding length of the body of the belt. The mesh 9 is preferably incorporated in the body of the connector block 11 by vulcanization and, due to the projection through the interstices in the mesh 9 of sufficient body material from opposite sides of the mesh, the resilience of the block 11 is substantially unimpaired by the incorporation therein of the metal mesh 9.

The provision of the block 11 in its disposition around the mesh 9 provides additional uniformity of operation of the belt due to the fact that the inclined side edge portions of the block 11 provide substantial continuation of the inclined side surfaces of the body of the belt 1. It is, of course, to be understood that, where it is desired, the block 11 may be formed of the same material and in the same manner as is the body of the belt 1, as may be clearly understood by reference to Figure 7.

The body of the belt 1 may also be provided with a layer of reinforced mesh at its neutral axis, as illustrated in Figure 7. When such reinforcement is provided, the mesh 9 of the connector block 11 is substantially in alignment with the mesh of the body of the belt and integral connection is provided between the ends of the mesh 9 of the connector block 11 and the end portions of the mesh in the body of the belt 1 by means of the clamping members 6 and the screws 8 which penetrate through apertures in the mesh in the body of the belt 1.

In Figures 4, 6, 7 and 8 is illustrated a modified construction in which the connector block 12, which is provided with a layer of metal mesh 9 disposed in alignment with the neutral axis of the belt, is made in the form of a corresponding length of the body of the belt 1, being provided with outer transverse slotted portions 2 and inner transverse slotted portions 3 which separate outer tooth portions 14 and inner tooth portions 15 respectively. The connector block 12 is secured to adjacent end portions of the belt 1 by means of oppositely disposed clamping members 16 which are provided with inturned flanges 17 at their ends which are adapted to be disposed respectively in the outer slotted portions 2 of the belt 1 and the connector block 12 and in the inner slotted portions 3 of the body of the belt 1 and the connector block 12. Clamping screws 18 extend through apertures in the outer clamping member 16 and are screw threaded through apertures in the inner clamping member 16, as illustrated in Figures 4, 7 and 8.

In the form illustrated in Figure 4, the body portion of the connector block 12 is formed of rubber or like resilient material, while, in the form illustrated in Figures 7 and 8, the body portion of the block 12 is formed of the same material as is the body of the belt 1, namely, of fabric impregnated with rubber. The belt 1, in the form illustrated in Figure 4, may, if desired, be reinforced with metal mesh 9 in the same manner as is the belt 1 of Figures 7 and 8.

In Figure 9, is diagrammatically illustrated the formation of an endless belt constituted of a plurality of lengths or sections 21 which are connected by means of inner and outer clamping members 16 and screws 18 cooperating therewith in the manner illustrated in Figures 4, 7 and 8. The bodies of the sections 21 are preferably provided with a layer of reinforcing flexible inextensible metal mesh 9, although, if desired, such reinforcement may be omitted.

As will be most clearly understood, by constructing such an endless belt, as illustrated in Figure 9, by the use of a plurality of lengths 21, it is possible (where the wear upon the belt is non-uniform with respect to its length or where a section or length 21 becomes unduly worn) in order to substantially renew the belt, to remove the screws 18 extending through the opposite end portions of the worn length or section 21, remove the worn section 21, replace the worn section 21 with a new length or section 21 and replace the removed screws 18 so that they extend through the end portions of the newly inserted length or section 21.

It is further to be understood that the length of the connector block 12, illustrated in Figures 4, 6 and 7, may be substantially increased, when desired, in order to provide for the adaptation, by change of length, of the belt 1 to a given drive assembly. While the belt 1, when reinforced by the use of inextensible metal mesh 9 becomes substantially inextensible, where this reinforcement is omitted, a connector block 12 of substantial length may be inserted in the connection between the ends of the belt 1 during its initial use, and, upon stretching of the belt 1, the length of the connector block 12 may be reduced to compensate for this stretching or to shorten the effective length of the belt. Likewise, the shortening of the belt may also be accomplished by shearing away one or more of the toothed sections of the belt proper 1.

Due to the free flexibility of the metal mesh 9 about axes disposed transversely thereof and due to the flexibility of the mesh 9 in the plane thereof, belt connectors constructed according to the principles of my invention provide far greater flexibility than is achievable in the use of articulated connectors formed entirely of rigid or non-resilient materials having pintles or hinges such as are well known. The disposition of the mesh 9 in substantial alignment with the neutral axis of the belt is particularly advantageous when the body of the belt 1 is provided with like reinforcement as is shown in Figures 7 and 8, because, due to the rigid connection between the mesh 9 in the body of the belt 1 and in the connector by means of the clamping members and screws, the effect achieved is substantially the same as though the inextensible reinforcing mesh 9 were formed as an endless member. The formation of the connector blocks 11 and 12 into the same shape as corresponding lengths of the body of the belt 1 produces a belt construction having more nearly the characteristics of a uniform and endless belt construction than has heretofore been achievable in the art.

By the use of belt connectors, constructed according to the principles of this invention, a more uniform traction is secured upon the driven pulleys than has hitherto been achievable and the wear upon the pulleys, as well as shock and vibration imparted thereto, is also substantially reduced.

It is, of course, to be understood that the belt may be provided with a wrapper of fabric impregnated with rubber or with oil resistant synthetic rubber or other material where the belt is designed for use in relations where contact with oil is contemplated. The connector blocks 11 and 12 may also be provided with such wrappers or covers. It is likewise contemplated that the end surfaces of the belt and/or connector blocks may be coated with such oil resistant materials to prevent the attack of oil and other materials to which rubber is vulnerable.

By the use of the term "mesh", I comprehend any associated metallic reinforcements such as wires and foraminous plates and material other than metal having these properties. Nails or other means can be employed instead of screws.

It is, of course, to be understood that the above described structure is merely illustrative of the manner in which the principles of my invention may be utilized and that I desire to comprehend within my invention such modifications as come within the scope of the claim and the invention.

Having thus fully described my invention, what I claim as new and desire to secure by Letters Patent, is:

In a cog belt connector, a connector block of resilient material provided with a reinforcing layer of flexible longitudinally inextensible metal mesh, and means for clampingly securing said connector block between the ends of a cog belt, said clamping means comprising rigid clamping members adapted to be secured to the ends of the connector block and to the ends of the cog belt by means of screws extending through the belt and through the reinforcement in said connector block.

ABRAHAM L. FREEDLANDER.